US011268002B2

(12) United States Patent
Scherrer (10) Patent No.: US 11,268,002 B2
(45) Date of Patent: Mar. 8, 2022

(54) MELTING AGENT AND SUBSTRATE MATRICES

(71) Applicant: Lawrence C Scherrer, Eau Claire, WI (US)

(72) Inventor: Lawrence C Scherrer, Eau Claire, WI (US)

(*) Notice: Subject to any disclaimer, the term of this patent is extended or adjusted under 35 U.S.C. 154(b) by 321 days.

(21) Appl. No.: 16/336,391

(22) PCT Filed: Sep. 29, 2017

(86) PCT No.: PCT/US2017/054246
§ 371 (c)(1),
(2) Date: Mar. 25, 2019

(87) PCT Pub. No.: WO2018/064450
PCT Pub. Date: Apr. 5, 2018

(65) Prior Publication Data
US 2020/0017739 A1    Jan. 16, 2020

Related U.S. Application Data (60) Provisional application No. 62/463,791, filed on Feb. 27, 2017, provisional application No. 62/401,625, filed on Sep. 29, 2016.

(51) Int. Cl.
*C09K 3/18* (2006.01)
*C09K 3/14* (2006.01)

(52) U.S. Cl.
CPC .............. *C09K 3/185* (2013.01); *C09K 3/149* (2013.01)

(58) Field of Classification Search
None
See application file for complete search history.

(56) References Cited

U.S. PATENT DOCUMENTS

| | | | |
|---|---|---|---|
| 2,626,219 | A | 1/1953 | Wagner |
| 4,012,537 | A | 3/1977 | Dubois |
| 4,108,669 | A | 8/1978 | Otrhalek et al. |
| 4,243,415 | A | 1/1981 | Lowe, Jr. |
| 4,296,207 | A | 10/1981 | Siegmund |
| 4,488,978 | A | 12/1984 | Gancy |
| 4,668,292 | A | 5/1987 | Koperdak |
| RE33,095 | E | 10/1989 | Gancy |
| 5,114,475 | A | 5/1992 | Siegmund et al. |

(Continued)

FOREIGN PATENT DOCUMENTS

KR    101617935 B1    5/2016

*Primary Examiner* — Jeffrey D Washville
(74) *Attorney, Agent, or Firm* — Bernard IP Law, LLC (57) ABSTRACT

According to the invention, a melting and traction matrix for use on icy or wet surfaces comprising at least one melting agent and at least one substrate impregnated therewith and a method for making and using same are disclosed. The matrix is applied to surfaces where ice is present or anticipated. Upon surface contact, the substrate provides immediate traction and melting agent dissipates from the substrate. Further melting agent dissipates slowly by diffusion for a long-term, persistent effect, in combination with the substrate, the overall amount of melting agent may be controlled, thereby mitigating potential corrosive, toxic and adverse cosmetic and/or environmental effects. The remaining substrate after melting agent has totally diffused may provide longer traction benefit or may be swept away.

14 Claims, 1 Drawing Sheet

(56) References Cited

U.S. PATENT DOCUMENTS

| | | | |
|---|---|---|---|
| 6,156,226 A | 12/2000 | Klyosov et al. | |
| 2004/0202755 A1 | 10/2004 | Myers et al. | |
| 2012/0193569 A1* | 8/2012 | Koefod | C09K 3/18 |
| | | | 252/70 |
| 2014/0319408 A1 | 10/2014 | Koefod | |
| 2016/0122254 A1* | 5/2016 | Welborn | B01J 20/045 |
| | | | 71/62 |

* cited by examiner

MELTING AGENT AND SUBSTRATE MATRICES

RELATED APPLICATIONS

This application claims the benefit of priority from U.S. Provisional Patent Application No. 62/401,625, filed on 29 Sep. 2016, and U.S. Provisional Patent Application No. 62/463,791, filed on 27 Feb. 2017, the disclosures of which are hereby incorporated by reference in their entirety.

FIELD OF INVENTION

The present invention relates generally to deicing, melting, and traction forming composition matrices and methods of making and using same. More specifically, the present invention is directed to, for example, road and walkway maintenance via a source of nontoxic, biodegradable, melting and traction enhancing material and formulations and compositions which comprise a melting agent impregnated substrate forming a deicing, melting, and/or traction matrix.

BACKGROUND OF THE INVENTION

Slick, icy, wet, and snowy surfaces are a problem, particularly in cold climates, and are a significant source of, e.g., injury from slip-and-fall accidents. Numerous methods and myriad compositions are known in the art and available to melt ice and/or provide traction, but each has limitations. De-icing and anti-icing agents are used on surfaces where frozen precipitation is a problem. Deicing involves the application of a deicing agent onto frozen precipitation that has already formed in order to remove it from a surface. The deicing agent melts by lowering freezing point. Anti-icing involves the application of an anti-icing agent onto a surface before ice is present, thereby lowering the freezing point of any precipitation that contacts the surface and preventing it from turning into ice. Some agents are useful as both deicing and anti-icing agents.

Agents with various compositions, such as, inorganic salts, e.g., calcium, sodium, potassium and magnesium chlorides, and non-salt organic compounds, e.g., urea, are used in various combinations and forms purposed for deicing or melting slick walkways or roads. These agents wash away with melt water and therefore are not persistent. Abrasives, such as, sand, clay, cinders, and charcoal, may be used as well to provide physical traction. These traction agents may be persistent, but have limited ability to melt ice, e.g., in the absence of sunlight.

Deicing, anti-icing, melt, and traction agents each have significant limitations. The agents wash away as water drains and re-application is necessary with new precipitation. Also, when the melted area refreezes anew, a smoother and/or slicker layer of ice often forms. While working, those dissolved melting agents may be tracked into the house on footwear and eventually precipitate or crystallize, e.g., as the water evaporates, leaving unsightly and potentially damaging deposits on flooring, e.g., wood, carpet, etc. Salts can also be corrosive to biologic materials and, for example, may damage lawns and plants. Traction agents, such as sand, cinders, slag, and charcoal, may damage surfaces when tracked indoors, and while some are porous enough to absorb some melt agent, they have inconsistent absorption of external moisture (melt) necessary to persistently release melt agent. Both chemical agents and traction agents may be heavy and difficult to carry or transport in quantity.

There is a need for a single melting and/or deicing product that provides the necessary exothermic and/or endothermic properties, e.g., lowering of the freezing/melting point of water, exothermic dissolution, in combination with traction properties while not draining away, separating while penetrating ice, destroying floors, or damaging companion animal paw pads. The development of novel combinations of melting and traction matrices would provide both immediate and persistent melting capability and traction. The present invention solves these needs and overcomes each of the shortcomings described hereinabove.

SUMMARY OF THE INVENTION

The present invention overcomes the existing drawbacks and prior art by providing for an environmentally sound deicing and/or melting agent and traction forming substrate combination matrix that provides immediate and persistent melting and traction aspects. A matrix that provides traction and melting action on snow and/or ice on a surface persists when the surface ice or snow melts and when the melt, on the wet surface, refreezes is described. The persistence may diminish the total amount of melting agent necessary for maintaining a consistent melt. Said substrate, abrasive, or traction agent may be a single composition, e.g., bark chips, comprise a combination of traction agents or configurations, or comprise a composite material, provided the substrate is lightweight, absorbent, and of appropriate size, geometry, and texture for foot or vehicle traffic, such that it provides traction without causing damage or interfering with movement. For example, the substrate may be solid but not so hard as to damage indoor floor surfaces and may be impregnated, coated, and/or infused with a melting agent, in combination creating a melting and traction matrix. In use, the matrix is applied to surfaces that are or may become wet or icy to simultaneously provide melting action and traction immediately and persistently.

Advantages of the present invention include, for example, melting agent adsorbed on the surface of the matrix is released immediately and absorbed agent is released slowly providing both an immediate and prolonged freezing point depression and ice melting effect; traction is created and maintained even in the absence of melting agent as the matrix is retained on the surface upon which it is deposited; matrix may be broken down via foot or vehicle traffic; the matrix tends to spread to wet areas; and, the matrix may be comprised of environmentally benign or beneficial elements.

Another object of the present invention is to provide a matrix which is easily stored and handled for disbursement onto wet, icy, snowy, or slick surfaces for providing immediate and persistent melt and traction functionality.

In some embodiments, the present invention utilizes a deicing and/or anti-icing composition in combination with a substrate which absorbs and/or adsorbs the melt agent, and which when applied to an ice covered surface immediately release the adsorbed composition followed by slower release of the absorbed composition, thereby providing an immediate and effective mode of traction and melt function as well as a persistent traction and melt function.

In some embodiments, the invention comprises substrate particles ranging in size from about 1/16 inch to 4 inches or larger, preferably having about 3/8-3/4 inch diameter, length, and/or width, constructed of a substrate, e.g., pine bark, in combination with a melting agent, e.g., calcium chloride, at an appropriate ratio of substrate to melting agent, e.g., about ten parts by weight bark and about two parts by weight calcium chloride, with a range of about 1% to over 50% possible, depending on the intended use.

In some embodiments, the invention comprises substrate particles having about a ⅜ inch or less diameter, length, and/or width, the substrate comprising, e.g., pine bark, in combination with a melting agent, e.g., calcium chloride, at a ratio of about two parts by weight bark and about one part by weight calcium chloride.

In some embodiments, the invention comprises a substrate, e.g., pine bark, in combination with non-salt melting agent, e.g., urea.

In some embodiments, the invention comprises a substrate, e.g., pine bark, in combination with a salt melting agent and a non-salt melting agent.

In some embodiments, visual indicators and/or radiation absorbers, e.g., shapes or colorants, respectively, may be employed for utility and/or aesthetic purposes.

In some embodiments, a deicing and traction matrix comprising: at least one substrate; and at least one melting agent; wherein the substrate is impregnated with a melting agent to produce the matrix.

In some embodiments, the substrate is selected from the group consisting of bark, bark chips, crushed bark, exploded bark, wood, wood chips, gelled particulate, beads, gel, biological particulate, biological particulate pellets, paper particulate, paper particulate pellets, beet pulp shreds, beet pulp pellets, sawdust pellets, and combinations thereof.

In some embodiments, the at least one melting agent is a salt or salt acid.

In some embodiments, the at least one melting agent is selected from the group consisting of calcium acetate, calcium chloride, calcium magnesium acetate, magnesium acetate, magnesium chloride, potassium chloride, potassium acetate, sodium chloride, sodium acetate, carboxylic acid salt, hydroxycarboxylic acid salt, dicarboxylic acid salt, citric acid salt, and mixtures thereof.

In some embodiments, the at least one melting agent selected from the group consisting of urea, sugar, steep water, alcohol, and mixtures thereof.

In some embodiments, the matrix further comprises a radiation absorber.

Broadly, the present invention contemplates a deicing and traction matrix. When practiced as disclosed herein, the present invention provides a novel, effective, non-corrosive, and environmentally sound product, and is thus, useful as disclosed above but is not intended to be limited to these uses.

BRIEF DESCRIPTION OF THE DRAWINGS

FIGS. 1a-1c depict non-limiting illustrative examples of substrates of the present disclosure.

DETAILED DESCRIPTION OF THE INVENTION

The embodiments of the present invention described herein provide exemplary embodiments only, and are not intended to be exhaustive, limit the scope, applicability or configuration of the disclosure. Rather, the description of the exemplary embodiments provides those skilled in the art with an enabling description for implementing one or more exemplary embodiments. It is understood by those skilled in the art that various changes may be made in the function and arrangement of elements without departing from the spirit and scope of the invention as set forth in the appended claims.

Unless specifically noted, it is intended that the words and phrases in the specification and the claims be given their plain ordinary and accustomed meaning to those of ordinary skill in the applicable arts. Accordingly, various implementations may be very broadly adopted and applicable.

Described herein is a melting and traction matrix comprising melting agent impregnated substrate having various features. The deicing melt agent and substrate matrix for producing surface traction is comprised of: a substrate into which a deicing melt agent is impregnated, thereby creating a matrix that produces both immediate and persistent melt and traction. Thus, a melt and traction matrix in which a substrate is impregnated, e.g., with an environmentally and mammal friendly melting agent, is disclosed, wherein the matrix immediately and persistently deices the surface upon which it is distributed and simultaneously creates traction on the surface.

As used herein, the term "substrate" means a substance or layer that underlies something, or on which some process occurs, in particular, a material that provides the surface on which something is deposited or impregnated. As used herein, the term substrate includes analogous and partially analogous terminology.

As used herein, the term "impregnate" means to soak, expose to, absorb into, adsorb onto, or saturate something, e.g., a substrate, with a substance, composition, or agent. As used herein, the defined term impregnate includes those analogous terms that those skilled in the art would refer to as impregnate or impregnated, or by at least partially analogous terms such as infuse, soak, steep, saturate, drench, coat, adsorb, encrust, etc., or the like.

A "matrix" or "matrices" as used herein means an environment, material, medium, or structure that is developed or produced, and includes analogous and partially analogous terminology that the skilled artisan would refer to as a matrix.

The present invention provides a deicing and/or melting agent and traction forming substrate combination matrix for immediate and persistent melting and traction on a surface to which it has been distributed. A matrix that provides traction and melting action on snow and/or ice on a surface persists when the surface ice or snow melts and refreezes is described. The present invention may utilize salt, e.g., sodium chloride, calcium chloride, ammonium chloride, or a combination thereof, as the melting agent aspect of the matrix. The persistence aspect of the invention may diminish the total amount of melting agent necessary for maintaining a consistent melt. The substrate, or traction agent, may be comprised of a single component, e.g., bark chips, may be comprised of a combination of components, e.g., bark chips in combination with crushed bark and/or exploded bark, or may comprise a composite material, e.g., pellets, provided the substrate is lightweight, porous, and of appropriate size, geometry, and texture for foot or vehicle traffic, such that it provides traction without causing damage or interference with movement. For example, the substrate may be solid but not so hard as to damage indoor floor surfaces or road surfaces, and may be impregnated with a melting agent, in combination creating a melting and traction matrix. In use, the matrix is applied to surfaces that are or may become wet or icy to simultaneously provide melting action, prolonged freezing point depression, and traction immediately and persistently.

Cycles of thawing, evaporation, and/or refreezing tend to create wet, dry, and combination wet/dry surface areas such that normal foot traffic may cause the lightweight matrix particles to move between dry and wet areas, where increased friction keeps them in place. Thus, when wet areas refreeze, good traction is still maintained because matrix particles that are buoyant in water remain floating in a melted concavity or on the surface of icy puddle. Thus, when the water re-freezes, traction is maintained. The treated area is easily visible and remains visible in subsequent days unless covered by significant snowfall, minimizing the need for re-application and the mass of melting agent, e.g., salt, used in relation to melting agent only compositions. The present invention, thus, has a positive environmental impact by at least minimizing chemical caused corrosion, aesthetic damage, and surrounding living biologic material (plant and grass) death.

In use, the matrix reabsorbs surrounding water (melt) and dispersed melt agent like a sponge as the treated surface dries. This action limits melting agent deposition on surfaces and ensures continued melt efficacy of the matrix. A biological or synthetic substrate, such as bark or gel may be biodegradable and further minimize the environmental impact of the matrix as it would not be expected to have adverse effects on a municipal sewer systems, drainage or irrigation systems, lawns, or plants. In some embodiments, used up and swept away matrix will naturally compost and feed the surrounding areas. Matrix particles that have frozen onto a surface may be covered by later snowfall. Additional matrix may be added to the surface area and/or removal of the overlying layer of snow will expose the adhered matrix that maintains traction and exposed, colored or uncolored matrix particles will absorb radiation, i.e., solar energy, and enhance ice melting on sunny days.

When compared to ice melting particles, e.g., rock salt or the like, the matrix may have less ice melting agent impregnated therein, melt that may drain away or that may be tracked indoors will have less dissolved melting agent and therefore cause less damage. Hence, dried deposits may be diminished, providing both an aesthetic and minimized damage benefit to flooring and/or the environment. Matrix may be produced that is soft enough that when tracked indoors does not damage floors and can be removed by simple sweeping, rather than washing.

Any known or yet to be developed composition, e.g., salt, salt acid, or non-salt, useful as a melting or deicing agent such that it induces ice melting, either endothermic or exothermic, or a combination thereof, may be impregnated into the substrate to create the instant matrix. Through choice of substrate material and amount of melting agent impregnated, the matrix may be selectively determined to be of a certain size and weight, and preferably, to be lightweight and easily spread either manually or mechanically. Used matrix particles may then be swept away for natural decomposition and fertilization of biologic material, unlike traditionally used traction agents, for example, sand, and melt agents, e.g., rock salt. The use of a substrate in tandem with a melting agent minimizes the amount of melting agent needed, and in turn, minimizes the risk of damage to living biologic material.

The present matrix may be comprised of any biodegradable substrate capable of physical breakdown in combination with any freezing point depressing agent considered to be environmentally and/or mammal friendly. Preferably, the present invention utilizes a deicing and/or anti-icing agent in combination with a substrate which absorbs and/or adsorbs the agent, and which when applied to an ice covered surface immediately releases the adsorbed agent followed by on-going persistent release of the absorbed agent, thereby providing an immediate and effective mode of traction and melt function as well as a persistent traction and melt function.

Substrate

Substrate particles may range in size and configuration based on desired attributes and/or materials from which they are constructed. For example, in some embodiments, the invention comprises substrate particles ranging in size from about $1/16$ inch to 4 inches or larger, preferably having about $3/8$-$3/4$ inch diameter, length, and/or width. In some embodiments, the invention comprises substrate particles having about a $3/8$ inch or less diameter, length, and/or width. Crushed bark particles useful in the presently described matrix may have less than about $3/8$ inch diameter, length, and width, while pellets comprising the present matrix may be purposefully produced in myriad selected diameters and lengths. Pine bark is an example of a soft, porous substrate that may be particularly useful in the present matrix, however, any variety of bark or wood or composite materials may be employed in the present matrix. In one embodiment, pine bark is combined with a salt melting agent, e.g., calcium chloride, at a ratio of about ten parts by weight bark and about two parts by weight calcium chloride. In another embodiment, crushed bark substrate is combined with a calcium chloride melting agent at a ratio of about two parts by weight bark and about one part by weight calcium chloride may be employed to produce a matrix of the present invention.

The production of pellets from, e.g., wood chips, bark chips, sawdust, paper pulp, beet pulp, and other particulate, is known in the art. Combining a melting agent into the pelleting process for the purpose of impregnating the pellet with a melting agent, followed by the optional adsorption of melt agent to the finished product pellet produces a matrix envisioned by the present invention.

The substrate may alternatively be comprised of a synthetic particulate comprising absorptive materials, or by-products, e.g., paper pulp, beet pulp, that are bound, e.g., gelled, pelleted, cross-linked, in such a way that they provide persistent traction and are still absorptive, and thus useful in the matrix of the present invention. Alternatively, the melting agent may be included in the binding or cross-linking of the synthesis. Such processes are well known in the art and therefore not described herein.

In some embodiments, the substrate may have intrinsic nutritive or fertilizing value for plants. For example, beet pulp, e.g., shreds or pellets, may be used as the substrate. It contains protein and acts as an organic, naturally occurring (non-manufactured) plant fertilizer. When this substrate is impregnated with melting agent is may be used to provide traction and melt as described herein. After use, the spent matrix can be swept or shoveled onto a lawn or plants adjacent to treated surfaces, where it will decompose into a nutritive fertilizer.

Figure 1A:
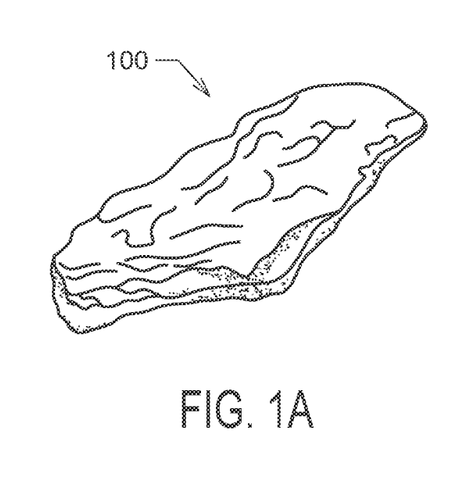
FIG. 1a illustrates the use of a single type of particulate material as substrate (for example, bark chip) in an embodiment of the invention.
Figure 1B:
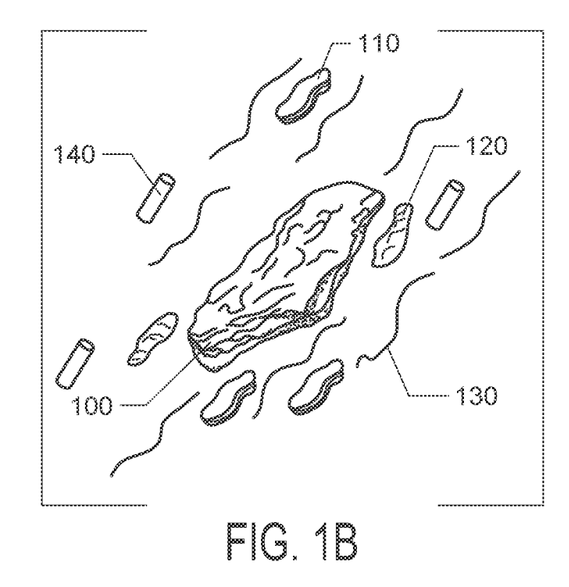
FIG. 1b illustrates the use of a combination of sizes and materials as substrate, e.g., bark chip, pellet, crushed bark, gel, and pulp, in an embodiment of the invention.
Figure 1C:
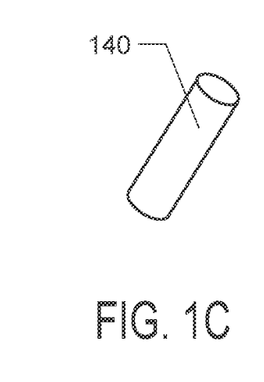
FIG. 1c illustrates the use of an alternate single type of particulate material as substrate (for example, pellet) in an embodiment of the invention.

The substrate of the present invention may be comprised of totally or partially biodegradable materials, and may be constructed in any number of natural, colored, or bleached appearance formats. Production of the substrate may further include selection or production of size and/or shape, including a mixture of sizes and/or shapes, which may be adjusted to suit the specific use of the matrix. For example, a substrate may be comprised of a single type of particulate such as a bark chip 100 (see, FIG. 1*a*) or pellet 140 (see, FIG. 1*c*), or combination of two or more sizes and/or materials, such as, bark chip 100, pellet 140, crushed bark 110, gel 120, and beet pulp shreds 130 (see, FIG. 1*b*).

Also well known in the art is the process of exploding bark and subsequently creating a desired shape with the exploded bark. Exploded bark and/or bark chips may be used, e.g., pressed, cut, stamped, to create discrete shapes and sizes of substrate, e.g., aesthetic visual indicators. Any substrate material alone or in combination with one or more other substrate materials may comprise a substrate mixture and be useful in combination with a melting agent as a matrix. Exploded bark visual indicators may further comprise at least one radiation absorber, e.g., coloring agent. Either embodiment, a visual indicator or visual indicator and radiation absorber, may be employed for utility and/or aesthetic purposes.

In one embodiment, pine bark is used for the matrix because of its low cost, light weight and availability. The bark should preferably be free of wood chips. Wood, itself, may have less preferable properties than bark, such as, lower absorptive ability, poorer traction based on longitudinal splintering, and more difficult or dangerous handling because of splinters and the like, depending on how it is processed. If processing is performed in a way to limit adverse characteristics, wood chips may be used as a matrix as well.

Bark is mechanically chipped and then screened to the desired size. Smaller pieces have more surface area so can absorb and release more salt more quickly. They have a lower physical profile that may be aesthetically desirable as they are less visible. Larger pieces have a larger physical profile, so will provide better traction with thicker ice on surfaces and will be less likely to wash away with melting water.

In some embodiments, substrate is chosen from a group consisting of: bark, bark chips, crushed bark, exploded bark, wood, wood chips, gelled particulate, beads, gel, biological particulate, biological particulate pellets, paper particulate, paper particulate pellets, beet pulp shreds, beet pulp pellets, sawdust pellets, and combinations thereof.

Melting Agent

Numerous potential melting agent compositions are known in the art, e.g., salts, non-salts, organic acid salts, organic compounds, polyols, soluble carbonate or bicarbonate salts, glycerol, etc. In some embodiments of the present invention, the melting agent may be selected from the group consisting of calcium acetate, calcium chloride, calcium magnesium acetate, magnesium acetate, magnesium chloride, potassium chloride, potassium acetate, sodium chloride, sodium acetate, carboxylic acid salt, hydroxycarboxylic acid salt, dicarboxylic acid salt, carbonate, carbonate salt, citric acid salt, urea, sugar, steep water, alcohol, and mixtures thereof.

The quantity by weight of one or more of the melting agent compositions disclosed herein, known in the art or yet to be discovered, for a given quantity by weight of substrate may be varied over a wide range and still obtain an effective traction and deicing action. Such determinations and calculations are not considered onerous. The amount of a melting agent or agents used in the matrix depends on the action desired, i.e., a higher ratio of impregnated melting agent to substrate may be used for prolonged melting, while a higher ratio of adsorbed melting agent may be used for immediate melting, without significantly changing the traction aspect presented by the substrate selection.

Many different salts are commonly used as melting agents and can be used in the present matrix, including chloride salts of sodium, potassium or calcium. Urea, sugars, or other melting agents that can be absorbed by a substrate can also be used. The amount of melting agent used compared to substrate on a weight/weight basis may range from about 1% to 99%, preferably, from about 10% to 75%, and more preferably from about 20% to 50%, depending on the desired properties. The concentration of a melting agent solution used for impregnating a substrate may range from lightly saturated to fully saturated to super saturated, and may comprise a single melting agent, e.g., a salt, or a combination of two or more melting agents, e.g., a mixture of salt and urea. The action of the melting agents is essentially the same for any of the matrices of the present invention in which the melting agent is absorbed into the substrate and/or adsorbed onto the substrate: the immediate release of the adsorbed melting agent from the substrate upon application to any surface, and thereafter the continued release of absorbed melting agent to promote persistent and prolonged melt action.

The percent expresses melt agent/salt mass added as percent of substrate mass, rather than final mass ratio. For example, the matrix may comprise the weight/weight ratio of substrate to melting agent ranging from 1% to 99%, 99%-1%, or preferably 20% to 50%. The melting agent may comprise a lesser fraction of the substrate weight, e.g., 20-40%. Beyond 50% melt agent/substrate, arguably bark is added to salt rather than salt-infused bark, however, it is possible to produce up to about 90% salt/matrix based on the light weight of bark. Thus, 1% salt (99% bark) allows the matrix of the present invention to provide melt. In some embodiments, the weight of melt agent ranges from 1% to 99% of the weight of substrate, preferably 20% to 40% for melt agent absorbed into substrate; preferably 1% to 40% for melt agent adsorbed onto substrate; and 1% to 99% for melt agent both absorbed into and adsorbed onto substrate.

In some embodiments, soluble carbonate or bicarbonate salts may be used having the additional advantage of forming carbon dioxide gas within the substrate under slightly acidic conditions. This gas provides additional buoyancy for the matrix in melt water furthering the maintenance of surface traction upon refreezing of melt water.

In some embodiments carbonate or bicarbonate-treated substrate may be coated with a dry acid or acid salt. Exposure to liquid water from the melting process dissolves the acid which then diffuses into the substrate, activating $CO_2$ production. Such acids could comprise any water-soluble organic or inorganic acid or acid salt including tartaric acid, citric acid, sodium acid pyrophosphate or monocalcium phosphate.

In some embodiments, non-salt melting agents, e.g., urea, sugar, steep water and/or alcohol, may be utilized as a melting agent alone or in combination with salt melting agents in the matrix of the present invention, and may be preferred for use around companion animals because these agents are sometimes referred to as "paw safe."

A melting agent of the presently disclosed matrices may be comprised of a single, or a combination of two or more, melting agents disclosed herein or known in the art.

Matrix

In combination, by impregnating a substrate with a melting agent, a matrix is produced. The proportion of melting agent as well as the size and shape of the substrate may be adjusted to suit a specific use. The substrate may be impregnated with melting agent through any known or yet to be known methods therefor, e.g., coating, soaking, pressure treating, and the like. The final moisture content of the matrix may vary, e.g., ranging from 0% to 100%, in the final product. The amount and type of melting agent in combination with the type of substrate may be used to determine an optimal final product, i.e., matrix, water content, shape, size, melting agent or agents, substrate or substrates, etc., without the necessity of undue experimentation, based on known phenomena. Multiple combinations are possible based on, for example, ambient temperature, desired melt, environmental effects, breakdown-ability, etc. For example, Magnesium Chloride, is known to provide effective melt effect to greater than about −25'F and considered to be safer than Sodium Chloride for humans, animals, and vegetation because it releases about 40% less chloride. Organic salts, e.g., sodium, calcium, magnesium, and potassium, are organic chemical compounds that bread down naturally and leave behind little damage. In another example, in a matrix comprising Calcium Chloride as the melting agent or part of a melting agent mixture, there may be an advantage to completely removing the matrix water content, e.g., via drying, in order to maximize the exothermic nature of dissolution. In other examples comprising alternative salts, a moisture content ranging from 1%-100% may drive the efficacy of melting agent.

Moisture content may be measured by a moisture meter. Indicator scales and substrate scales on moisture meters can vary, but all will indicate moisture content in percent (% MC). Typically, wood moisture content ranges in the 5 to 40% range. However, a relative scale of 0 to 100 may be used, where 0 is bone dry and 100 is saturated. This is a relative scale.

The amount of drying a matrix requires may be related to production costs, while the type of drying, e.g., autoclave, may solubilize the salt at a high temperature-pressure combination, thereby producing a matrix with predetermined slightly elevated moisture content. Multiple methods of drying particulate are well known in the art, e.g., air, conveyor, and therefore not included in this discussion.

In some embodiments, substrate may be combined with melting agent via adsorption, i.e., without absorption, to the external surfaces of substrate wherein a sufficient amount of melting agent is supplied such that the matrix melts the snow or ice and the substrate creates traction. Thus, minimal melt agent may be used both lowering matrix production cost and any potentially adverse environmental effects while the matrix would still embed quickly into snow or ice because of the melting agent direct contact.

Alternatively, the matrix product may carry a significant amount of absorbed melting agent while still maintaining the appearance of non-treated and/or decorative bark. In some embodiments, the matrix may further comprise radiation absorbers, e.g., coloring agents.

Radiation Absorbers

Some embodiments of the present invention further comprise radiation absorbers, e.g., coloring agents may be combined with the substrate and melting agent, thereby producing alternative matrix embodiments. In addition to absorbing solar radiation and increasing potential melt capabilities of the matrix and in turn reducing the amount of melting agent necessary to achieve desired melt, embodiments including radiation absorbers may be more visually functional. e.g., by creating contrast and becoming easier to be detected by the human eye, or aesthetically pleasing. It is common for pedestrians and drivers to have difficulty seeing slick or wet surfaces, for example, become snow blind. Snow blindness (a.k.a., photokeratitis) is a type of temporary eye damage caused by snow reflecting UV light. Even before snow blindness sets in, reflections and shadows may interact to make it difficult to see or distinguish slippery or icy surfaces. The addition of color to the matrix presents a clear indication to pedestrians or drivers that the matrix of the present invention is present on a surface, and therefore, allows them to choose a path that is treated. Matrix manufactured by treating substrate with a melting agent may have a natural look, and may appear to a casual observer to be untreated substrate. Matrix including coloring agent in manufacture, in use clearly and easily identifies as a treated substrate.

Coloring agents may comprise any dye, lake, pigment, or substance that imparts color to the matrix and/or absorbs radiation, e.g., heat. They may be many forms. e.g., granules, liquid, powder, gels, paste, or other special purpose forms. Due to their safety to humans, animals, and the environment, as well as their generally availability, food colorings are envisioned as one source of matrix coloring agent. Coloring agents may, for example, be utilized to offset color loss due to outdoor element exposure, simulate natural colors, correct natural color variations, provide novelty or branding, or allow consumers to identify products on sight.

Coloring agents may be naturally occurring or synthetically produced. Natural occurring coloring agents are derived from natural sources, such as, vegetable, mineral, or animal, for example, annatto, beet extract, caramel, carmine, elderberry juice, charcoal, lycopene, paprika, beta-carotene, turmeric, Carotenoids, chlorophyllin, anthocyanins, betanin, and grape skin extract. Synthetically produced coloring agents may impart a more intense, uniform color, and may be used to more easily create a variety of specific hues. Examples of a few common synthetic coloring agents include: Indigo Carmine, Allura Red AC, Quinoline Yellow WS, Anthocyanin. Brilliant Blue FCF, Indigotine, Fast Green FCF, Erythrosine, Tartrazine, Sunset Yellow FCF, Quinoline Yellow, Carmoisine, Ponceau 4R, Patent Blue V, Vanta black, Naphthol Green B, and Green S. These limited lists of potential coloring agents are not intended to be limiting to the present invention. In general, any coloring agent certified as safe or deemed unnecessary to certify by appropriate authorities, e.g., FDA, EFSA, JECFA, may be utilized as an environmentally safe coloring agent in the present invention.

Coloring agents may include functional or non-functional agents, or a combination thereof. An example of a functional coloring agent is an agent comprising a combination of a non-functional coloring agent and a melting agent. Examples of a non-functional—other than to provide color—coloring agent may include dyes, paints, stains, pigments, etc. The resulting exterior texture of a colored substrate particle may be crystalline, smooth, uniform, flakey, etc.

Coloring agent addition to the matrix may further provide aesthetic brand identification of, for example, manufacturer, corporate identity, season, team affiliation, etc. It is envisioned that custom ordered colors, or natural/color blends, or multicolor blends may be made available. In addition to being easily identifiable in use, colored matrix may attract consumers' eyes in a retail setting, thereby providing additional value and utility in the field of sales and marketing.

In some embodiments, a single uniform color may be used to manufacture matrix. In some embodiments, a fraction, ranging from 1%-99%, of the total amount of substrate may be colored. For example, in one embodiment, 35% of a colored matrix may be combined with 65% of a natural matrix, thereby creating an aesthetically pleasing mixture that is easily identifiable. In another embodiment, a mixture may be comprised of 65% colored matrix and 35% natural. Colored matrix combinations may range from 1% to 99% of each color in combinations of 2 or more colored matrices. In some embodiments, multiple colors, either in equal or disproportional ratios, may be utilized. In some embodiments, different sized substrate particles may be used for either the colored or natural components. Any number of combinations, standardized and/or custom may be potential mixtures without compromising the utility of the resulting matrix.

For purposes of manufacture, coloring agents may be incorporated into the matrix via impregnation prior to, concurrently with, or subsequent to, the impregnation of a melting agent, wherein a coloring agent may be incorporated throughout the substrate or adsorbed to the external surface of the final matrix product via, e.g., spraying, dipping, or the like.

Further aesthetic aspects of the invention may include visually distinct matrix particles. For example, matrix manufactured with or without distinct color combinations may carry distinct shapes, e.g., organization logos, charity ribbons, animal shapes, professional indicia, etc. Because the manufacture of matrix includes multiple combinations of substrate material and melting agents that may be combined, it is important to note that that certain matrix aspects be maintained, e.g., biodegradability, identifying treated travel paths, creation of traction, and effective melt. In some embodiments, exploded bark or crushed bark may be employed to product substrate particulate carrying a select shape. In some embodiments, a single uniform shape may be used to manufacture matrix. In some embodiments, a fraction, ranging from 1%-99%, of the total amount of substrate may carry a specific shape. For example, in one embodiment, 35% of a first shaped matrix may be combined with 65% of a second shaped matrix, thereby creating an aesthetically pleasing mixture that is easily identifiable. In another embodiment, a mixture may be comprised of 65% first shaped matrix and 35% of a second shape. Shaped matrix combinations may range from 1% to 99% of each shape in combinations of 2 or more differently shaped matrices. In some embodiments, multiple shaped, either in equal or disproportional ratios, may be utilized. In some embodiments, different sized substrate particles may be used for either the first or second shaped components. Any number of combinations, standardized and/or custom may be potential mixtures without compromising the utility of the resulting matrix.

Example 1: Pine Bark and Calcium Chloride

The present invention was initially reduced to practice with pine bark because of the softness of pine, but any material that can be chipped, chopped, or cut to an appropriate size and is able to absorb melting agent may be suitable. Such materials may include biologic (e.g., nut shells, husks) and/or synthetic material (e.g., paper (hardened or cross-linked and chopped), beet pulp, absorptive beads, gel) having appropriate use properties may be used.
Preparation:

The melting agent, calcium chloride, was dissolved in an appropriate amount of water to a chosen concentration to allow absorption into and distribution across the surface of bark chip substrate having a ⅜ to ¾ inch width. The prepared melting agent solution was mixed with bark chip substrate. The melting agent-substrate mixture was allowed to sit for about 1 minute to 48 hours, preferably 12 hours, long enough for the bark to absorb as much liquid as possible, i.e., to become saturated. The impregnated substrate was then air dried at ambient temperature for 48 hours resulting in a final matrix product. Alternatively, drying may be achieved in an oven, drying apparatus, or the like.

Pine bark pieces measuring ⅜-¾ inch (1.5 kg) was mixed with 300 g CaCl2 (20% w/w) dissolved in 750 ml water until all bark was thoroughly wetted. This mixture was allowed to sit at room temperature for 12 hours with occasional mixing, at which time all liquid was absorbed into the bark. Wet bark was spread into a thin layer and dried at ambient temperature for 48 hours. Some bark was dried in an oven at a temperature of 170-200° F. for approximately 1-2 hours. Both types of dried matrix were dry to the touch and showed no visible surface salt.
Use:

The matrix comprising 20% (w/w) CaCl2 in pine bark was applied to both snow and Ice-covered sidewalks at a rate of 500 cm2 matrix/m2 surface. Immediate improvement of traction on ice was noted and the matrix quickly embedded itself within ice.

The matrix remained substantially in place with foot traffic of approximately twenty people per day. The point where a driveway crosses a sidewalk can be particularly problematic for ice build-up. Matrix also stayed in place in these icy tire tracks and provided traction on the otherwise icy surface. Similarly, areas of sidewalk where snow and ice melted during the day and re-froze at night retained traction in areas where matrix was present.

Matrix prevented the accumulation of light snow on treated surfaces. Heavy snow covered the matrix, but removal of this snow by shovel and snow-blower revealed retained matrix in the dense snow/ice mixture adhered to the sidewalk.

Temperatures during outdoor use testing ranged between −15 and 45° F.

In a parallel experiment, this same 20% $CaCl_2$/pine bark matrix was applied to the surface of an ice sheet in a freezer at 10° F. At 30 min the ice sheet was tilted to a 90° angle and substantially all of the matrix remained adhered to the sheet. Simultaneously applied untreated substrate showed no adherence.

The matrix may be comprised of a single size or mixture of substrate particle sizes, for example, a small mesh less than ⅜ inch or a larger mesh ranging from ⅜-¾ inch. For example, smaller matrix particles with a higher melting agent to bark content, such as 50% weight/weight, may be mixed with larger matrix particles having a lower melting agent content, such as 20%. This exemplary mixture would provide immediate traction of acceptable or aggressive levels while the smaller matrix particles would provide immediate melt action.

In all embodiments, the weight/weight ration refers to the relative weight of solute dissolved in solutions to the weight of the substrate. For example, 20 g to 50 g of salt may be dissolved in water to create a melting agent solution that is impregnated into 100 g of bark substrate.
Method of Use:

In use, the desired matrix may be applied, scattered manually and/or mechanically broadcast, on and across surfaces, such as, walkways, sidewalks, porches, entryways, driveways, roadways, thoroughfares, ingress and egress pathways, on which traction and/or melting is desired. The matrix may be utilized in anticipation of or in response to freezing conditions or precipitation. Upon contact with the surface, the matrix immediately melts the present snow or ice and creates traction. The matrix continues to release impregnated melting agent during the time of deposition and while traffic, foot or machine, breaks it down and it is either blown away or swept away, providing persistent melt effect.

Example 2: Bark Plus Non-Salt

The present invention may be practiced with pine bark or other substrate, and a non-salt melting agent, e.g., urea. The use of urea as a melting agent is well known in the art. Urea may be dissolved in or mixed with an appropriate amount of water to a chosen concentration to allow absorption into and distribution across the surface of bark chip substrate having a ⅜ to ¾ inch width. The prepared melting agent solution may be mixed with bark chip substrate, allowed to sit for a period of about 1 minute to 48 hours, preferably 12 hours; long enough for the bark to absorb as much liquid as possible, i.e., to become saturated. The impregnated substrate may then be dried at ambient temperature, in an oven, or other know method of or apparatus for drying, for about 1 minute to multiple days, preferably about 48 hours, resulting in a final matrix product. Dried matrix should be dry to the touch and show little or no visible surface evidence of melting agent.
Use:
The matrix comprising a non-salt impregnated pine bark may be applied to both snow and ice-covered surfaces at a rate that effectively provides sufficient melt in relation to conditions, for example, immediate improvement of traction, embedding into ice, and prevention of accumulation of precipitation on treated surfaces.

Example 3: Bark Plus Salt and Non-Salt Combination

The present invention may be practiced with a substrate and a mixture of a salt and non-salt melting agent. Myriad salt and non-salt melting agents capable of depressing the freezing point either alone or in combination with other melting agents are known in the art. A mixture may be prepared by dissolving in or mixing with an appropriate amount of water to a chosen concentration to allow absorption into and distribution across the surface of the substrate. The prepared melting agent solution may be combined with substrate, allowed to sit for a period of about 1 minute to 48 hours, preferably 12 hours; long enough for the substrate to absorb as much liquid as possible, i.e., to become saturated. The impregnated substrate may then be dried at ambient temperature, in an oven, or other know method of or apparatus for drying, for about 1 minute to multiple days, preferably about 48 hours, resulting in a final matrix product. Dried matrix should be dry to the touch and show little or no visible surface evidence of melting agent.
Use:
The matrix comprising a mixture of salt and non-salt impregnated substrate may be applied to both snow and ice-covered surfaces at a rate that effectively provides sufficient melt in relation to conditions, for example, immediate improvement of traction, embedding into ice, and prevention of accumulation of precipitation on treated surfaces.

Example 4: The Addition of Radiation Absorber

The present invention may be practiced with a substrate and melting agent with the addition of a radiation absorber, e.g., coloring agents. The optional addition of a radiation absorber utilizes the additional absorption of environmental heat to increase the efficacy of melt of the matrix. Radiation absorbers may be dissolved in or mixed with the melting agent prior to absorption into substrate, and thus, simultaneously absorbed. Alternatively, radiation absorbers, with or without melting agent, may be adsorbed on to the outer surface of a substrate after impregnation with a melting agent. Alternatively, radiation absorbers may be used in concert with melting agent and adsorbed to the exterior surface of substrate. Dried matrix incorporating radiation absorbers should be dry to the touch and show visible surface evidence of the radiation absorbers, e.g., exhibit color.
Use:
The matrix radiation absorber combination may be applied to both snow and ice-covered surfaces at a rate that effectively provides sufficient melt in relation to conditions, for example, immediate improvement of traction, embedding into ice, prevention of accumulation of precipitation on treated surfaces, and visible evidence of matrix.

Example 5: Pellet Matrix

Pellets produced from, e.g., paper particulate, crushed bark, sawdust, and beet pulp, may incorporate a binder, e.g., polymer or gel, comprising at least one melting agent, provide impregnated pellets with a melting agent during the pelletizing process. Pellets may further have applied an external, adsorbed, layer of melting agent to the final pellet product via a known method, e.g., spraying.

The pellet embodiment of the present invention may be practiced with salt, non-salt, and/or a radiation absorber, each of which may be incorporated into a binder for impregnation or adsorbed to the external surface of a pellet matrix product, or any combination thereof. The final matrix pellet should be dry to the touch and show little or no visible surface evidence of melting agent.
Use:
The pellet matrix may be applied to both snow and ice-covered surfaces at a rate that effectively provides sufficient melt in relation to conditions, for example, immediate improvement of traction, embedding into ice, and prevention of accumulation of precipitation on treated surfaces. Upon spreading the pellet matrix in a standard method use, the external melting agent immediately begins melting the snow/ice, while the pellet matrix begins to absorb water and persistently release melting agent and providing traction. Over time, the pellet matrix breaks down, e.g., disintegrates, leaving, compostable particulate that may be swept away without negatively impacting the surrounding environment.

Example 6: Exploded Bark

The process of exploding bark and subsequently creating a desired shape with the exploded bark is well known in the art. Exploded bark may be, e.g., pressed, cut, or stamped, to create discrete shapes and sizes of substrate. Discretely shaped substrate impregnated with one or more melting agents comprise a matrix of the present invention. Melting agent impregnation of discretely shaped substrate may include absorption, adsorption, or both. Exploded bark matrices may further comprise at least one radiation absorber. Either embodiment, a visual indicator or visual indicator and radiation absorber combination, may be employed for utility and/or aesthetic purposes. For purposes of manufacture, coloring agents may be incorporated into the exploded bark matrix via impregnation prior to, concurrently with, or subsequent to, the impregnation of a melting agent, wherein a coloring agent may be incorporated throughout the substrate or adsorbed to the external surface of the final matrix product via, e.g., spraying, dipping, or the like.

The preceding detailed description has related but a few of many possible ways of configuring the matrix of the instant invention comprising at least one melting agent, and at least one type and/or size of substrate. Infinite variations of the foregoing matrices are possible, e.g., simply by changing melting agent(s), combining multiple melting agents, changing substrates, combining multiple substrate types or particles sizes, etc., and consequently would violate the spirit of this invention. The invention may be used either alone or in combination with other melting agents or traction agents and/or conveniences. One skilled in the art will readily recognize that the disclosed matrices, methods of manufacture, and methods of use thereof of the present invention can be readily incorporated into one of the established formats for production of melting and/or traction agents and the like that are well known in the art. The invention has been described in detail for the purposes of clarity and understanding. One skilled in the art could make any number of embodiments and/or adjustments thereto based on elements such as size, construction material, weight, method of use, etc., without undue experimentation. It will be appreciated that certain changes and modifications may be practiced within the scope of the invention. Accordingly it is intended that all such alteration, variations, and modification are within the scope of the present invention.

We claim:

1. A deicing and traction matrix providing immediate and persistent action comprising:
   at least one substrate comprised of an absorbent and buoyant material; and
   at least one melting agent;
wherein the at least one substrate is impregnated with at least one melting agent to produce the deicing and traction matrix.

2. The substrate of claim 1, wherein the substrate is selected from the group consisting of bark, bark chips, crushed bark, exploded bark, wood, wood chips, biological particulate, biological particulate pellets, sawdust pellets, and combinations thereof.

3. The matrix of claim 1, wherein the at least one melting agent is a salt.

4. The matrix of claim 1, wherein the at least one melting agent is a non-salt.

5. The matrix of claim 3, wherein the at least one melting agent salt is selected from the group consisting of calcium acetate, calcium chloride, calcium magnesium acetate, magnesium acetate, magnesium chloride, potassium chloride, potassium acetate, sodium chloride, sodium acetate, carboxylic acid salt, hydroxycarboxylic acid salt, dicarboxylic acid salt, citric acid salt, carbonate, carbonate salt, and mixtures thereof.

6. The matrix of claim 4, wherein the at least one melting agent non-salt is selected from the group consisting of urea, sugar, steep water, alcohol, and mixtures thereof.

7. The matrix of claim 1, wherein the at least one melting is selected from the group consisting of calcium acetate, calcium chloride, calcium magnesium acetate, magnesium acetate, magnesium chloride, potassium chloride, potassium acetate, sodium chloride, sodium acetate, carboxylic acid salt, hydroxycarboxylic acid salt, dicarboxylic acid. salt, citric acid salt, carbonate, carbonate salt, urea, sugar, steep water, alcohol, and mixtures thereof.

8. The matrix of claim 1, wherein the weight /weight ratio of substrate to melting agent is 1% to 99%.

9. The matrix of claim 1, wherein the weight/weight ratio of substrate to melting agent is 20% to 50%.

10. The matrix of claim 1, wherein the weight/weight ratio of substrate to melting agent is 99% to 1%.

11. The matrix of claim 1, further comprising a radiation absorber.

12. The matrix of claim 11 wherein the radiation absorber is naturally occurring or synthetically produced.

13. The matrix of claim 12, wherein the naturally occurring radiation absorber is selected from the group consisting of annatto, beet extract, caramel, carmine, charcoal, elderberry juice, lycopene, paprika, beta-carotene, turmeric, Carotenoids, chlorophyllin, anthocyanins, betanin, and grape skin extract.

14. The matrix of claim 12, wherein the synthetically produced radiation absorber is selected from the group consisting of Indigo Carmine, Allura Red AC, Quinoline Yellow WS, Anthocyanin, Brilliant Blue FCF, Indigotine Fast Green FCF, Erythrosine, Tartrazine, Sunset Yellow FCF, Quinoline Yellow, Carmoisine, Ponceau 4R, Patent Blue V, Vanta black, Naphthol Green B, and Green S.

* * * * *